3,359,255
WATER-INSOLUBLE DISAZO-DYESTUFFS
Hans Wilhelm Liechti, Oberwil, Basel-Land, Switzerland, assignor to Ciba Limited, Basel, Switzerland, a Swiss company
No Drawing. Filed Sept. 1, 1964, Ser. No. 393,782
Claims priority, application Switzerland, Sept. 11, 1963, 11,222/63; July 22, 1964, 9,638/64
6 Claims. (Cl. 260—188)

The present invention provides new disazo dyestuffs free from groups imparting solubility in water, for example, sulfonic acid or carboxylic acid groups, which dyestuffs correspond to the formula

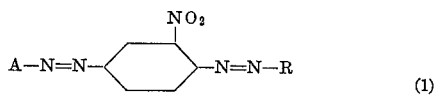
(1)

in which A represents a benzene radical that may be substituted, R represents a 2 - hydroxy - naphthalene or 2 - amino - naphthalene radical bound to the azo group in 1 - position.

Especially valuable are dyestuffs of the formula

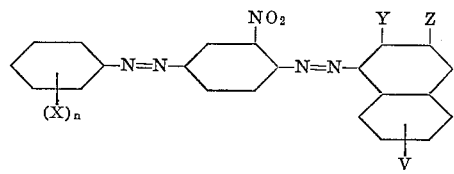

in which X is a member selected from the group consisting of hydrogen, chlorine, bromine, lower alkyl and lower alkoxy, Y a member selected from the group consisting of hydroxy and amino groups, Z a member selected from the group consisting of hydrogen and carboxophenylamido groups, V is a member selected from the group consisting of hydrogen and lower alkoxy and N is a whole number of at most 2.

The new dyestuffs are obtainable by coupling the diazo compound of an aminoazo dyestuff free from groups imparting solubility in water, which dyestuff corresponds to the formula

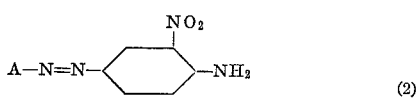
(2)

in which A and X have the meanings ascribed to them in the Formula 1, with a 2 - hydroxynaphthalene or a 2 - aminonaphthalene capable of coupling in 1 - position.

The aminoazo dyestuffs of the Formula 2 can be prepared by the process disclosed in my patent application No. 393,761 filed Sept. 1, 1964, in which process a hydroxydisazo dyestuff of the formula

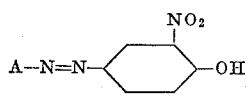

which dyestuff is obtainable by coupling a diazotised aminobenzene with a corresponding ortho-nitrophenol, for example, ortho-nitrophenol or 1 - hydroxy - 2 - nitro- 5 - chlorobenzene, is heated with ammonia dissolved in alcohol. The aminobenzene that is used may be aniline or one of its derivatives substituted by halogen atoms or alkyl or alkoxy groups, for example, 2-, 3-, or 4 - chloraniline, 3 - bromaniline, 2-, 3- or 4 - methylaniline, 2-, 3- or 4 - methoxyaniline, 3 - trifluoromethylaniline, 2:5-dichloraniline, 3:5 - bis - trifluoromethylaniline, 2 - trifluoromethyl - 4 - chloraniline, 2 - chloro - 3 - trifluoromethylaniline or 4 - chloro - 2 - methylaniline.

The coupling components used are 2-aminonapthalenes, and especially 2 - hydroxynapthalenes of the formula

in which Y represents a hydrogen atom or a carbalkoxy group or a —CONH— aryl group, and Z represents a hydrogen atom or a halogen atom or an alkyl or alkoxy group.

The diazotisation of the aminoazo dyestuffs of the Formula 2 may be carried out by the customary known methods, for example, with the aid of hydrochloric acid and sodium nitrite. In accordance with the process of the invention, the diazomonoazo compounds thus obtained are coupled with the end components, for example, in a medium made alkaline with an alkali carbonate, if desired or required in the presence of an agent that assists coupling, for example, pyridine or piccoline, or advantageously in acid for example acetic acid medium.

The new dyestuffs are eminently suitable for dyeing and printing polyester fibrous material, especially polyethylene terephthalate, especially after they have been converted into a state of fine division, for example, by grinding, pasting or reprecipitating. They yield pure, strong orange to violet tints that are distinguished by an excellent fastness to light and to sublimation when applied to such material by the usual dyeing processes, for example, when applied from a dye liquor containing a fine dispersion of the dyestuff and advantageously a dispersing agent at a temperature close to 100° C., if necessary, in the presence of a swelling agent, or at a temperature above 100° C. under superatmospheric pressure. It is surprising that the new dyestuffs have such a good fastness to light, since the dyestuff indicated in "Berichte," vol. 56, 2353 (1923), which contains phenol as coupling component instead of 2 - hydroxynaphthalene or 2-aminonaphthalene, has a very poor fastness to light, and the dyestuff having the Color Index No. 26,105, which differs from the dyestuffs of the invention in that it contains a methyl group instead of a nitro group, likewise has a very poor fastness to light. The new dyestuffs have the additional advantage that they produce only a very slight coloration on any wool that may be present in the dyebath, and are thus very suitable for dyeing union fabrics made from wool and polyester fibre.

The dyestuffs of the invention are also suitable for application by the so-called "Thermosol" process in which the fabric to be dyed is impregnated at a temperature not exceeding 60° C. with an aqueous dispersion of the dyestuff, which advantageously contains 1 to 50% of urea and a thickening agent, especially sodium alginate, and then squeezed in the usual manner. Squeezing is advantageously carried out in a manner such that the impregnated fabric retains 50 to 100% of its dry weight of dye liquor. In order to bring about fixation of the dyestuff, the impregnated fabric is heated to a temperature above 100° C., for example, to a temperature between 180 and 210° C., for example, in a current of hot air, it being advantageous to dry the impregnated material prior to the heat treatment.

The above-mentioned Thermosol process is specially suitable for dyeing union fabrics made from polyester fibres and cellulosic fibres, especially cotton. In this case, the padding liquor contains a dyestuff or dyestuffs suitable for dyeing cotton, for example, vat dyestuffs, in addition to a dyestuff or dyestuffs of the invention. When vat dyestuffs are used, the padded fabric has to be treated with an aqueosu alkaline solution of one of the reducing agents customarily used in vat dyeing, which treatment is carried out after the heat treatment.

The following examples illustrate the invention. Unless otherwise stated, the parts and percentages are by weight.

EXAMPLE 1

24.2 parts of 4-amino-3-nitro-1:1'-azobenzene are diazotised and the diazo compound is coupled at 5 to 10° C. with a solution of 14.4 parts of 2-hydroxynaphthalene made alkaline with sodium hydroxide. Coupling takes place rapidly and the disazo dyestuff precipitates completely. It is isolated, washed with water until free from alkali, and then dried. The new water-insoluble dyestuff of the formula

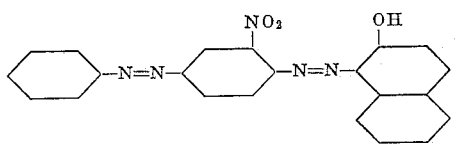

is a red powder that dyes polyester fibres bright red tints when applied in a state of fine division. The dyeings thus obtained possess a very good fastness to light and to sublimation. Any wool that may be admixed with the polyester fibre remains practically uncolored.

Dyestuffs having the same good properties are obtained when 2-hydroxy-6- or -7-methoxynaphthalene is used as second coupling component instead of 2-hydroxynaphthalene.

The aminoazo dyestuff used as diazo component is obtained in the following manner:

24.3 parts of 4-hydroxy-3-nitro-1:1'-azobenzene are heated for 15 hours at 165 to 170° C. in a closed vessel in a solution comprising 30 parts of ammonia gas in 400 parts of ethyl alcohol. When the reaction is finished, the reaction mixture is concentrated to ⅓ of its volume, filtered, and then washed with cold ethyl alcohol. A test portion of the 4-amino-3-nitro-1:1'-azobenzene thus obtained is recrystallized from alcohol. It melts at 173° C. The amounts obtained on analysis likewise correspond to the calculated amounts for this compound.

EXAMPLE 2

27.65 parts of 4-amino-3-nitro-2'-chloro-1:1'- azobenzene are diazotised and the diazo compound is coupled at 5 to 10° C. with a solution of 17.4 parts of 2-hydroxy-6-methoxynaphthalene made alkaline with sodium hydroxide. Coupling takes place instantaneously and the diazo dyestuff precipitates completely. It is isolated by filtration, washed with water until free from alkali, and then dried. The new water-insoluble dyestuff of the formula

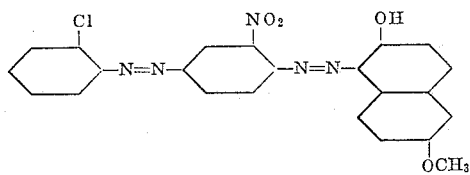

is a red powder that dyes polyester fibres attractive red tints when applied in a state of fine division. The dyeing thus obtained possess a good fastness to light and to sublimation. Any wool that may be blended with the polyester fibre is only very slightly colored.

When the 4-amino-3-nitro-2'-chloro-1:1'-azobenzene is replaced by 4-amino-3-nitro-3'-chloro-1:1'-azobenzene or 4-amino-3-nitro-4'-chloro-1:1'-azobenzene or 4-amino-3-nitro-2':4'-dichloro-1:1'-azobenzene or 4-amino-3 - nitro-4'-methoxy-1:1'-azobenzene or 4-amino-3-nitro-2'-methyl-1,1'-azobenzene, dyestuffs are obtained that exhibit the same good properties when used for dyeing polyester fibres.

The aminoazo dyestuffs used as diazo components can be obtained by the process described in the last paragraph of Example 1.

EXAMPLE 3

24.2 parts of 4-amino-3-nitro-1:1'-azobenzene are diazotised and the diazo compound is coupled at 5 to 10° C. with a solution of 30.7 parts of 2-hydroxy-3-napthoic acid-ortho-phenetidide made alkaline with sodium hydroxide. Coupling takes place immediately and the dyestuff precipitates completely. It is isolated, washed with water until free from alkali, then dried. The water-insoluble dyestuff of the formula

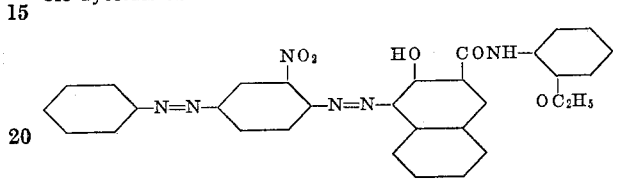

is a red powder that dyes polyester fibres bright red tints when applied in a state of fine division. The dyeings thus obtained possess a very good fastness to light and to sublimation. Any wool that may be blended with the polyester fibre remains practically uncolored.

A dyestuff having the same good properties is obtained when 2-hydroxy-3-naphthoic acid-ortho-anisidide or 2-hydroxy-3-napthoic acid phenylamide is used as end coupling component.

EXAMPLE 4

24.2 parts of 4-amino-3-nitro-1:1'-azobenzene are diazotised and the diazo compound is coupled at 10 to 15° C. with a solution of 14.3 parts of 2-aminonaphthalene acidified with acetic acid. Sodium acetate is added to complete coupling. The dyestuff, which precipitates completely, is isolated, washed with water until free from alkali, and then dried. The water-insoluble dyestuff of the formula

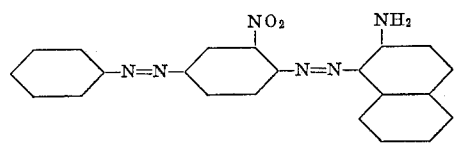

is a dark powder that dyes polyester fibres bright violet tints when applied in a state of fine division. The dyeings thus obtained possess a very good fastness to light and to sublimation. Any wool that may be blended with the polyester fibre is only very slightly colored.

A dystuff having the same good properties is obtained when 4-amino-3-nitro-2'-chloro-1:1'-azobenzene is used instead of 4-amino-3-nitro-1:1'-azobenzene.

EXAMPLE 5

1 part of the dyestuff obtained in the manner described in Example 1 is ground in the wet state with 2 parts of a 50% aqueous solution of sulfite cellulose waste liquor, and the preparation thus obtained is dried.

The dyestuff preparation thus obtained is stirred with 40 parts of a 10% aqueous solution of a condensation product of octadecyl alcohol and 20 mols of ethylene oxide, and then 4 parts of an acetic acid solution of 40% strength are added. A dyebath of 4000 parts is prepared by diluting the mixture with water.

100 parts of cleansed polyester fibre material are entered into this bath at 50° C., the temperature of the bath is raised to 120 to 130° C. in the course of half an hour, and dyeing is continued for 1 hour at that temperature in a closed vessel. The material is then well rinsed.

A dyeing possessing a very good fastness to light and to sublimation is obtained.

EXAMPLE 6

100 parts of a union fabric comprising 50 parts of polyethylene terephthalate fibre and 50 parts of wool are entered at 50° C. into a bath containing 5 parts of a 75% aqueous emulsion of salicyclic acid methyl ester as accelerator, 1 part of the sodium salt of diisobutyl-naphthalene sulfonic acid and 1 part of the dyestuff indicated in the first paragraph of Example 1 per 1000 parts of water. The bath is then brought to the boil in the course of 1 hour, boiling is continued for 1½ to 2 hours, and then dyed material is well rinsed with warm water. Washing off is not necessary. The polyester portion of the material is dyed a bright red, while the wool portion is only slightly tinted.

EXAMPLE 7

14 parts of the dyestuff used in the first paragraph of Example 1 are finely ground in a ball mill in 126 parts of a neutral solution of 125 parts of dinaphthylmethane disulfonic acid in 1000 parts of water.

A padding liquor having the following composition is prepared:

|  | Parts |
|---|---|
| Dyestuff paste described above | 200 |
| Sodium alginate 1:100 | 300 |
| Water | 500 |
|  | 1000 |

A polyester fabric is padded with the above padding liquor (2 runs) in such a manner that its weight is increased to 50 to 60%, whereupon it is dried at 60° C. The fabric is then subjected to a heat treatment for 15 to 120 seconds at a temperature of 200 to 220° C. The material is then soaped at the boil for 30 minutes in a solution comprising 5 grams of soap in 1 litre of water, and then further treated in the usual manner (rinsing, drying). A bright red dyeing possessing excellent properties of fastness is obtained.

What is claimed is:

1. A water-insoluble disazo dyestuff of the formula

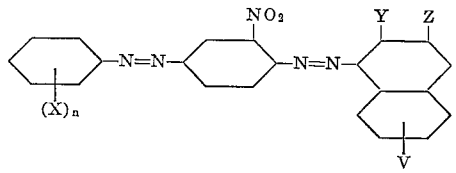

in which X is a member selected from the group consisting of hydrogen, chlorine, bromine, lower alkyl and lower alkoxy, Y a member selected from the group consisting of hydroxy and amino groups, Z is hydrogen and carboxophenylamido groups, V is a member selected from the group consisting of hydrogen and lower alkoxy, and $n$ is a whole number of at most 2.

2. The compound of the formula

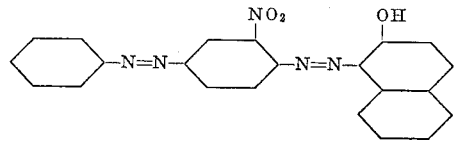

3. The compound of the formula

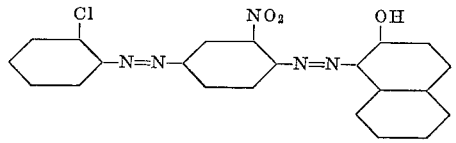

4. The compound of the formula

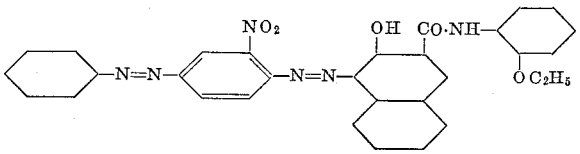

5. The compound of the formula

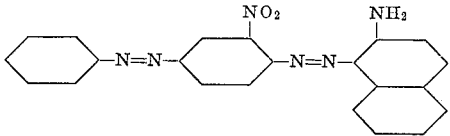

6. The compound of the formula

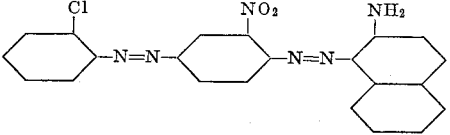

References Cited

UNITED STATES PATENTS 2,135,964  11/1938  Dahlen et al. _____ 260—187 X
3,096,140   7/1963  Gaetani _____ 260—187 X FLOYD D. HIGEL, *Primary Examiner.*